United States Patent [19]

Flesher et al.

[11] 4,256,660

[45] Mar. 17, 1981

[54] SULPHONATED DERIVATIVES OF ACRYLAMIDE AND THEIR PREPARATION

[75] Inventors: Peter Flesher, Bingley; Ian M. Johnson, Brighouse, both of England

[73] Assignee: Allied Colloids Limited, Bradford, England

[21] Appl. No.: 156,944

[22] Filed: May 28, 1980

[30] Foreign Application Priority Data

May 31, 1979 [GB] United Kingdom ............... 19042/79

[51] Int. Cl.$^3$ ........................................... C07C 143/02
[52] U.S. Cl. ................................................ 260/513 N
[58] Field of Search ................................... 260/513 N

[56] References Cited

U.S. PATENT DOCUMENTS

| | | | |
|---|---|---|---|
| 2,576,501 | 11/1951 | Dahor | 260/513 N |
| 3,178,385 | 4/1965 | Dinges et al. | 260/513 N |
| 3,417,134 | 12/1968 | Rinkler et al. | 260/513 N |

Primary Examiner—Alan Siegel
Attorney, Agent, or Firm—Lawrence Rosen

[57] ABSTRACT

A compound of the formula $$CH_2=CRCONHXNHCOCH_2CH_2SO_3M$$

where R is hydrogen or methyl, X is $CH_2$ or $-CH_2OCH_2-$ and M is H or a water soluble cation is made by reacting N-methylolacrylamide or N-methylolmethacrylamide with sulphonated N-methylolacrylamide.

7 Claims, No Drawings

SULPHONATED DERIVATIVES OF ACRYLAMIDE AND THEIR PREPARATION

It is well known to make sulphonated acrylamide derivatives. One useful derivative is 2-acrylamido-2-methylpropylsulphonic acid (AMPS). This can be polymerised to form a water soluble polymer which is of value as, for instance, a scale preventer. Another known acrylamide derivative is sulphonated methylene bisacrylamide.

Disadvantages exist in known methods of making many sulphonated acrylamides. The preparation of sulphonated methylene bisacrylamide by sulphonation of methylene bisacrylamide is described in U.S. Pat. No. 3,012,015. However this preparation has a number of disadvantages, among them the low solubility of methylene bisacrylamide in water. In an indirect method described in British Pat. No. 1,086,038 sulphonated methacrylamide derivative is prepared by reacting chloropropionamide with methacrylamide-N-methylolmethyl ether. This method also has a number of disadvantages.

It has been our object to devise a simple and efficient synthesis for making polymerisable sulphonated acrylamide derivatives including sulphonated methylene bisacrylamide.

In the invention we make sulphonated derivatives of acrylamide of formula:

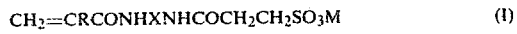

CH$_2$=CRCONHXNHCOCH$_2$CH$_2$SO$_3$M    (I)

where R is H or CH$_3$, X is —CH$_2$— or —CH$_2$OCH$_2$— and M is H, alkali metal or any other water soluble cation. Some of these compounds, and in particular those wherein X is —CH$_2$OCH$_2$, are novel.

The compounds of formula I are prepared in the invention by reacting N-methylolacrylamide or N-methylolmethacrylamide with sulphonated N-methylolacrylamide, i.e. a compound of the formula:

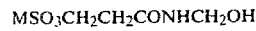

MSO$_3$CH$_2$CH$_2$CONHCH$_2$OH

The reaction is preferably carried out in aqueous solution and preferably the solution is concentrated, having a concentration of reactants of at least 20% and preferably from 40% to saturation. The reaction may be conducted merely by mixing the ingredients in aqueous solution at appropriate pH, concentration and temperature and maintaining the mixture at the chosen temperature for sufficient time for the reaction to be completed. The pH is preferably less than 3, most preferably 0.2 to 2.5. It may be necessary to add acid to the solution in order to obtain the desired pH. The reactants are preferably used in substantially equimolar proportions but there can be up to, for instance, 1.5 moles of either reactant per mole of the other reactant.

The reaction may be conducted for, for instance, 1 to 100 hours, generally 10 to 30 hours. The reaction may be conducted at any temperature between ambient temperature and elevated temperatures insufficient to cause polymerisation. If the reaction is conducted between, for instance 15° and 65° C. the reaction product tends to have X representing CH$_2$OCH$_2$, for instance the product being sodium 3-sulphopropanamide acrylamide ether. If the reaction is conducted above about 65° C. for instance up to 100° C. the product obtained tends to have X as CH$_2$, for instance the product being sodium sulphomethylenebisacrylamide. This product can also be obtained by heating the ether at a temperature above 65° C. in accordance with the equation

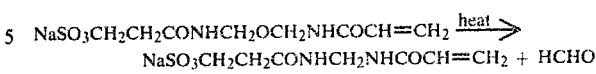

NaSO$_3$CH$_2$CH$_2$CONHCH$_2$OCH$_2$NHCOCH=CH$_2$ $\xrightarrow{heat}$
NaSO$_3$CH$_2$CH$_2$CONHCH$_2$NHCOCH=CH$_2$ + HCHO We have surprisingly found that the process of the invention is capable of giving more than 90% conversion. The reaction product is obtained in solution and can be separated by crystallisation at low temperature or the solution can be used directly for polymerisation.

The sulphonated monomer obtained in the invention can be polymerised by conventional techniques. If the monomer is a compound in which X represents —CH$_2$OCH$_2$— formaldehyde may be driven off, in accordance with the equation given above, during polymerisation if the polymerisation is conducted at a sufficiently elevated temperature. Polymerisation may be homopolymerisation or copolymerisation. The polymers may be water soluble or water-insoluble. Particularly preferred are copolymers with acrylic acid, and in particular copolymers of acrylic acid with a monomer in which X is CH$_2$OCH$_2$. Such polymers are new and have valuable properties as scale prevention aids.

The starting materials for the process of the invention can be readily obtained. Thus the preparation of methylolated acrylamide or methacrylamide is well known.

Methylolated sulphonated acrylamide or methacrylamide may be prepared by sulphonation of acrylamide, through addition to the double bond, followed by methylolation.

The sulphonation reaction may be carried out by mixing acrylamide and sodium bisulphite in equimolar amounts at room temperature and reacting for about 3 hours and allowing the temperature to rise due to the exothermic reaction. The reaction is represented by:

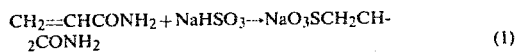

CH$_2$=CHCONH$_2$ + NaHSO$_3$ → NaO$_3$SCH$_2$CH$_2$CONH$_2$    (1)

The product of the above reaction can then be methylolated by reaction with formaldehyde. For this reaction, a temperature in the range 15°–55° C. and a pH in the range 8.5–11.5 are preferred and approximately equimolar amounts should be used.

The reaction is represented by:

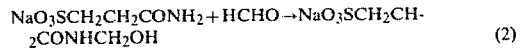

NaO$_3$SCH$_2$CH$_2$CONH$_2$ + HCHO → NaO$_3$SCH$_2$CH$_2$CONHCH$_2$OH    (2)

Typical preparations of starting materials are:

| Preparation of sodium 3-sulphopropanamide | | | |
|---|---|---|---|
| Recipe | acrylamide | (50% solution) | 200 g |
|  | Na$_2$S$_2$O$_5$ | (30% solution) | 446 g |
|  | PMP |  | 0.01 g |

The reaction mixture was refluxed at 85° C. for 3 hours in the presence of air. The final product contained 1.04% free acrylamide and 1.56% NaHSO$_3$.

| Preparation of methylolated sodium 3-sulphopropanamide | |
|---|---|
| Recipe | sodium 3-sulphopropanamide (SACM) 230.4g |
|  | Paraformaldehyde 36.4g |
|  | NaOH (46% solution) 0.6g |
|  | PMP 0.027g |

| -continued | |
|---|---|
| Preparation of methylolated sodium 3-sulphopropanamide | |
| H$_2$O | 230.4g |

The SACM, PMP and water were added to a flask and the temperature raised to 50° C. to form a solution. Paraformaldehyde was added and then the NaOH to give a pH of 10.5. The temperature of the flask was maintained at 60° C. for 90 mins. At the end of the reaction the free formaldehyde content was 0.5%.

The following is an Example of the invention.

EXAMPLE 1

| Recipe | Methylolated sodium 3-sulphopropanamide (42.6% aqueous solution) | 192.5 g |
|---|---|---|
| | Methylolated acrylamide (60.0% aqueous solution) | 67.3 g |

The pH of the mixture was adjusted to 1.0 by addition of 8.0 mls of conc. HCl and the reaction carried out at room temperature. After 21 hours, 92% conversion had been obtained. The product was a compound of formula I wherein X represents CH$_2$OCH$_2$ and R is H and M is sodium but on heating at 70° C. formaldehyde was evolved and the product was a compound of formula I wherein X represents CH$_2$.

We claim:

1. A process for making a compound of formula I $$CH_2\!=\!CRCONHXNHCOCH_2CH_2SO_3M \qquad (I)$$

wherein R is selected from hydrogen and methyl and X is selected from —CH$_2$— and —CH$_2$OCH$_2$— and M is selected from hydrogen and water soluble cations, in which N-methylolacrylamide or N-methylolmethacrylamide is reacted with sulphonated N-methylolacrylamide.

2. A process according to claim 1 in which the reaction is carried out in aqueous solution at pH below 3.

3. A process according to claim 2 in which the pH is 0.2 to 2.5.

4. A process according to claim 2 in which the concentration of reactants in the solution is from 40% by weight up to saturation.

5. A process according to claim 1 for making a compound of formula I wherein X represents CH$_2$ in which the reaction is conducted at 65° C. to 100° C.

6. A process according to claim 1 for the production of a compound of formula I wherein X represents CH$_2$OCH$_2$ and in which the reaction is conducted at a temperature of 15° to 65° C.

7. A process according to claim 1 in which R is hydrogen and M is hydrogen or alkali metal.

* * * * *